US012493830B2

(12) United States Patent
Pushak et al.

(10) Patent No.: US 12,493,830 B2
(45) Date of Patent: Dec. 9, 2025

(54) UNIFY95: META-LEARNING CONTAMINATION THRESHOLDS FROM UNIFIED ANOMALY SCORES

(71) Applicant: Oracle International Corporation, Redwood Shores, CA (US)

(72) Inventors: Yasha Pushak, Vancouver (CA); Hesam Fathi Moghadam, Sunnyvale, CA (US); Anatoly Yakovlev, Hayward, CA (US); Robert David Hopkins, II, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 574 days.

(21) Appl. No.: 17/994,530

(22) Filed: Nov. 28, 2022

(65) Prior Publication Data

US 2024/0095580 A1 Mar. 21, 2024

Related U.S. Application Data

(60) Provisional application No. 63/408,602, filed on Sep. 21, 2022.

(51) Int. Cl.
*G06N 20/20* (2019.01)
*G06F 16/23* (2019.01)
*G06N 20/00* (2019.01)

(52) U.S. Cl.
CPC ......... *G06N 20/20* (2019.01); *G06F 16/2365* (2019.01); *G06N 20/00* (2019.01)

(58) Field of Classification Search
CPC ... G06F 16/2365; G06F 16/906; G06N 3/045; G06N 20/00; G06N 20/20
See application file for complete search history.

(56) References Cited

U.S. PATENT DOCUMENTS

2014/0108314 A1\* 4/2014 Chen ................... G06F 11/3072
706/20
2018/0095004 A1 4/2018 Ide et al.
(Continued)

OTHER PUBLICATIONS

Zhou, Junlin, et al., "Unsupervised Learning Based Distributed Detection of Global Anomalies", 2010, International Journal of Information Technology and Decision Making, vol. 2010, Nov. 2010, pp. 1-11.

(Continued)

*Primary Examiner* — Larry T Mackall
(74) *Attorney, Agent, or Firm* — Hickman Becker Bingham Ledesma LLP (57) ABSTRACT

Herein is a universal anomaly threshold based on several labeled datasets and transformation of anomaly scores from one or more anomaly detectors. In an embodiment, a computer meta-learns from each anomaly detection algorithm and each labeled dataset as follows. A respective anomaly detector based on the anomaly detection algorithm is trained based on the dataset. The anomaly detector infers respective anomaly scores for tuples in the dataset. The following are ensured in the anomaly scores from the anomaly detector: i) regularity that an anomaly score of zero cannot indicate an anomaly and ii) normality that an inclusive range of zero to one contains the anomaly scores from the anomaly detector. A respective anomaly threshold is calculated for the anomaly scores from the anomaly detector. After all meta-learning, a universal anomaly threshold is calculated as an average of the anomaly thresholds. An anomaly is detected based on the universal anomaly threshold.

20 Claims, 5 Drawing Sheets

(56) References Cited

U.S. PATENT DOCUMENTS

| | | | |
|---|---|---|---|
| 2018/0276566 A1* | 9/2018 | Zhang | C07F 15/025 |
| 2020/0210393 A1 | 7/2020 | Beaver | |
| 2022/0086180 A1* | 3/2022 | Karpovsky | H04L 63/1425 |
| 2022/0138504 A1 | 5/2022 | Moghadam et al. | |
| 2022/0188694 A1 | 6/2022 | Suzani et al. | |
| 2023/0376366 A1* | 11/2023 | Seyfi | G06N 5/01 |

OTHER PUBLICATIONS

Vikram, Adiya, et al., "Anomaly detection in Network Traffic Using Unsupervised Machine learning Approach", 2020 5th Intl Conf on Communication and Electronics Systems (ICCES), vol. 5 (2020), pp. 476-479, Jul. 10, 2020, 4pgs.

Reunanen, Niko, et al., "Automatic optimization of outlier detection ensembles using a limited number of outlier examples", International Journal of Data Science and Analytics, vol. 10, pp. 377-394, Jun. 8, 2020, 18pgs.

Jiang, Bin, et al., "Clustering Uncertain Data Based on Probability Distribution Similarity", 2011, IEEE Transactions on Knowledge and Data Engineering, vol. 25 No. 4, pp. 751-763, publ Oct. 14, 2011, 13pgs.

Chou, Chien-Hsing, et al., "A New Cluster Validity Measure for Clusters with Different Densities", 2003, Proceedings of the IASTED International Conference on Intelligent Systems and Control, vol. 2003, Jan. 2003, pp. 1-6.

Angiulli, Fabrizio, "Concentration Free Outlier Detection", 2017, Machine Learning and Knowledge Discovery in Databases, vol. 2017, pp. 3-19.

Zhao et al., "Automatic Unsupervised Outlier Model Selection", in Advances in Neural Information Processing Systems, 34, dated 2021, 14 pages.

Yakovlev et al., "Oracle AutoML: A Fast and Predictive AutoML Pipeline", in Proceedings of the VLDB Endowment, vol. 13, No. 12, DOI: https://doi.org/10.14778/3415478.3415542, dated Aug. 2020, 15 pages.

Yao et al., "Rethinking Class-Prior Estimation for Positive-Unlabeled Learning", in International Conference on Learning Representations, dated Sep. 28, 2021, 12 pages.

Wang et al., "Towards a Hierarchical Bayesian Model of Multi-View Anomaly Detection", Twenty-Ninth International Joint Conference on Artificial Intelligence, dated Jul. 11, 2020, 7 pages.

Siffer et al., "Anomaly Detection in Streams with Extreme Value Theory", Proceedings of the 23rd ACM SIGKDD International Conference on Knowledge Discovery and Data Mining, https://hal.archives-ouvertes.fr/hal-01640325, dated Nov. 20, 2017, 10 pages.

Schubert et al., "On Evaluation of Outlier Rankings and Outlier Scores", 12th SIAM International Conference on Data Mining, dated 2012, 12 pages.

Perini et al., "Transferring the Contamination Factor between Anomaly Detection Domains by Shape Similarity", in Proceedings of the Thirty-Sixth AAAI Conference on Artificial Intelligence, vol. 36, No. 4, dated Jun. 2022, 9 pages.

Perini et al., "Class Prior Estimation in Active Positive and Unlabeled Learning", in Proceedings of the 29th IJCAI and the 17th PRICAI, dated Jul. 2020, 7 pages.

Palacio-Nino et al., "Evaluation Metrics for Unsupervised Learning Algorithms", Machine Learning, DOI: 10.48550/arXiv.1905.05667, dated May 23, 2019, 9 pages.

Nguyen et al., "An Evaluation Method for Unsupervised Anomaly Detection Algorithms", Journal of Computer Science and Cybernetics, V.32, N.3, dated 2016, 14 pages.

Kriegel at al., "Interpreting and Unifying Outlier Scores", in Proceedings of the 2011 SIAM International Conference on Data Mining, dated 2011, 12 pages.

Goix, Nicolas, "How to Evaluate the Quality of Unsupervised Anomaly Detection Algorithms?", Presented at ICML2016 Anomaly Detection Workshop, New York, NY, USA, 2016, 13 pages.

Dykes, Sandra, "Poster: An Extreme Value Theory Approach to Anomaly Detection (EVT-AD)", https://www.ieee-security.org/TC/SP2012/posters/An%20Extreme%20Value%20Theory%20Approach.pdf, dated 2012, 2 pages.

Davis et al., "LSTM-Based Anomaly Detection: Detection Rules from Extreme Value Theory", EPIA Conference on Artificial Intelligenc https://arxiv.org/pdf/1909.06041.pdf, dated Sep. 13, 2019, 12 pages.

Clemencon et al., "Scoring Anomalies: A M-estimation Formulation", Proceedings of the 16th International Conference on Artifical Intelligence and Statistics (AISTATS) 2013, vol. 31 of JMLR, 9 pgs.

Christoffel et al., "Class-prior Estimation for Learning from Positive and Unlabeled Data", Asian Conference on Machine Learning, PMLR, vol. 45, dated Feb. 2016, 16 pages.

Anonymous authors, "Versatile Outlier Detection With Outlier Preserving Distribution Mapping Autoencoders", conference paper at ICLR 2020, dated 2019, 13 pages.

Neuberg, Richard, et al., "Detecting Relative Anomaly", 2015 18th Intl Conf, on Mach Learning and Data Mining in Pattern Recognition, Lecture Notes in Computer Science, LNAI 10358. Springer, doi.org/10.1007/978-3-319-62416-7_9, Jul. 2, 2017, 15pgs.

Gao, Jing, et al., "Converting Output Scores from Outlier Detection Algorithms into Probability Estimates", 6th Intl Conf on Data Mining (ICDM'06), pp. 212-221, doi: 10.1109/ICDM.2006.43, Dec. 18, 2006, 10pgs.

Gao et al., "Converting Output Scores from Outlier Detection Algorithms into Probability Estimates", Sixth International Conference on Data Mining (ICDM'06) Hong Kong, China, 2006, pp. 212-221.

* cited by examiner

UNIFY95: META-LEARNING CONTAMINATION THRESHOLDS FROM UNIFIED ANOMALY SCORES

BENEFIT CLAIM

This application claims the benefit of Provisional Appln. 63/408,602, filed Sep. 21, 2022, the entire contents of which is hereby incorporated by reference as if fully set forth herein, under 35 U.S.C. § 119(e).

FIELD OF THE INVENTION

The present invention relates to anomaly detector calibration for machine learning (ML). Herein is a universal anomaly threshold based on several labeled datasets and transformation of anomaly scores from one or more anomaly detectors.

BACKGROUND

Unsupervised anomaly detection (UAD) algorithms identify unusual data points from among a dataset. For example, anomalous data points may correspond to security threats or diseases, depending on the application. UAD algorithms do not require any labeled data. Instead, UAD algorithms provide each data point with a rating, or an anomaly score, such that higher values are considered anomalous and lower values are considered normal. Users are then required to specify the percentage of the dataset that are anomalous (i.e. the contamination factor). However in most applications, users do not know how many of their data points are anomalous.

Contamination factor identification (CFI) is the problem of determining the percentage of anomalies in a given dataset, without being given any ground-truth labels (and therefore any information about what an anomaly should look like). This problem has not been addressed neither in literature nor by industry leading independent software vendors (ISVs) and original equipment manufacturers (OEMs). The state of the art addresses the following simplified versions of the problem, but not the original problem.

One way is to consider the problem of Class-Prior Estimation for Positive-Unlabeled Learning (Class-Prior Estimation is equivalent to contamination factor identification in the context of anomaly detection) where the goal is to identify the contamination factor given access to both positively-labeled data points and unlabeled data points.

Another way presumes access to another similar labeled dataset, from which to transfer the contamination factor by matching the distribution of anomaly scores of the two datasets.

Those ways make assumptions that are typically not verified for general real-life scenarios. In particular, the distribution of anomaly scores may be widely different from one dataset to another, and access is typically unavailable to examples of anomaly points as needed by techniques such as Positive-Unlabeled Learning, because an anomaly is unexpected by definition.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to anomaly detector calibration for machine learning (ML). Herein is a universal anomaly threshold based on several labeled datasets and transformation of anomaly scores from one or more anomaly detectors. Learning anomaly score thresholds can be used to: a) automatically estimate the contamination factor in a dataset and/or b) estimate the quality of a trained anomaly detection model, in the absence of any labels. Meta-learning herein is used to learn a unified anomaly score threshold that can be applied with an anomaly detector to an unlabeled dataset to facilitate prediction of the contamination factor of the dataset.

Contamination factor identification (CFI) has a dual problem. For a given dataset and set of anomaly scores, identifying the optimal contamination factor is equivalent to determining the optimal anomaly score threshold, above which data points are labeled as anomalous and below which they are labeled as non-anomalous. The state of the art cannot directly interpret anomaly scores as prediction probabilities and label everything above 0.5 as anomalous and everything below 0.5 as normal. Recent experiments with applying unsupervised anomaly detection (UAD) methods to datasets with known labels revealed that anomaly prediction so-called probabilities in the state of the art are not sophisticated enough to provide values that should be literally interpreted as prediction probabilities. However, given a set of scaled anomaly scores that are guaranteed to span a very similar range of values for every anomaly detector and every dataset, it is feasible to meta-learn a single anomaly score threshold that can be reliably used for new, unseen datasets.

This approach includes at least the following advantages.
Once trained, this approach can be re-applied to any new dataset with any new anomaly detection model. Unlike other approaches, this approach can estimate a new contamination factor without training more than a single anomaly detection model.

However, should a substantially different anomaly detection application arise, or should new models be invented with different anomaly score distributions, this approach can be retrained to be fine-tuned to these new, specific applications.

Once trained, this approach facilitates estimating the contamination factor of a dataset in constant time. It only requires a single model to be trained, whereas Kriegel's method for unifying anomaly scores needs at least linear time with respect to the number of data points in the data set.

This approach includes at least the following innovations.

A CFI procedure that combines anomaly score unification with a meta-learning approach to estimate contamination factors for anomaly detection datasets.

A method that combines contamination factor estimation with estimating the quality of a trained anomaly detection model.

In an embodiment, a computer meta-learns from each anomaly detection algorithm and each labeled dataset as follows. A respective anomaly detector based on the anomaly detection algorithm is trained based on the dataset. The anomaly detector infers respective anomaly scores for tuples in the dataset. The following are ensured in the anomaly scores from the anomaly detector: i) regularity that an anomaly score of zero cannot indicate an anomaly and ii) normality that an inclusive range of zero to one contains the anomaly scores from the anomaly detector. A respective anomaly threshold is calculated for the anomaly scores from the anomaly detector. After all meta-learning, a universal anomaly threshold is calculated as an average of the anomaly thresholds. An anomaly is detected based on the universal anomaly threshold.

1.0 Example Computer

Figure 1:
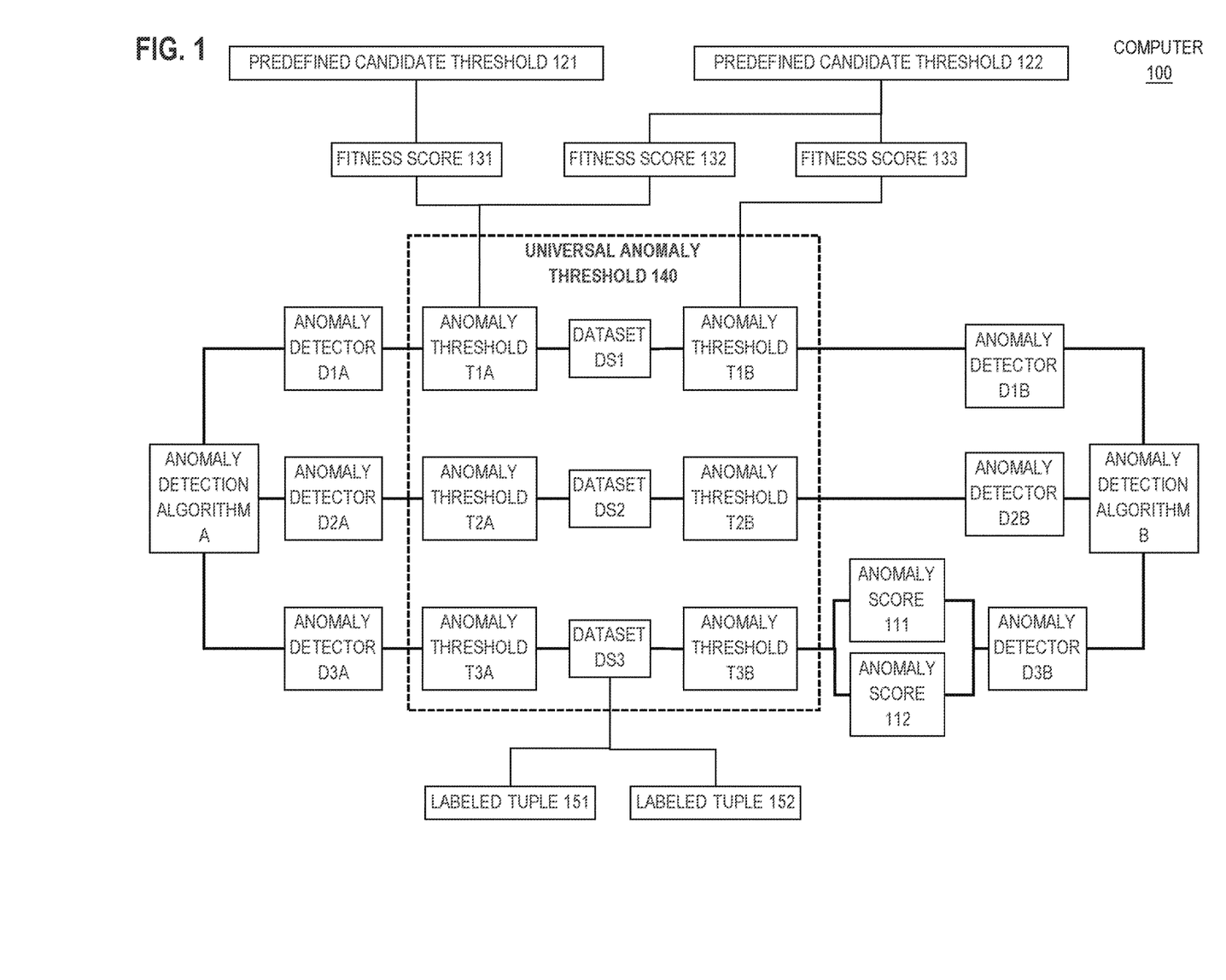
FIG. 1 is a block diagram that depicts an example computer that provides anomaly detector calibration for machine learning (ML) using a universal anomaly threshold based on several labeled datasets and transformation of anomaly scores from one or more anomaly detectors.

FIG. 1 is a block diagram that depicts an example computer 100. In an embodiment, computer 100 provides anomaly detector calibration for machine learning (ML) using universal anomaly threshold 140 that is based on several labeled datasets DS1-DS3 and transformation of anomaly scores from one or more anomaly detectors such as anomaly detector D3B that infers anomaly scores 111-112 and anomaly detectors D1A-D3A and D1B-D2B. Computer 100 may be one or more of a rack server such as a blade, a personal computer, a mainframe, or a virtual computer.

1.1 Datasets

Each of datasets DS1-DS3 contain tuples or objects that can be represented by tuples, such as a data structure that contains fields, such as a message, a log entry, a network packet, or a semi-structured document such as JavaScript object notation (JSON) or extensible markup language (XML). For example, dataset DS3 contains tuples 151-152.

For example, a tuple may be or can be encoded as a feature vector that anomaly detectors D1A-D3A and D1B-D3B can accept as input and process to infer an anomaly score that measures how unusual is the tuple.

All tuples in datasets DS1-DS3 are labeled, which means that each tuple has a respective Boolean label that indicates whether the tuple is anomalous or non-anomalous. Depending on the embodiment, each anomaly detector was trained with a training corpus that does or does not include some or all of datasets DS1-DS3. For example, training of an anomaly detector may be supervised with training labels or unsupervised, depending on which anomaly detection algorithm is the anomaly detector based on.

1.2 Anomaly Detectors Based on Anomaly Detection Algorithms

For example, anomaly detection algorithm A may be artificial neural network (ANN) and anomaly detection algorithm B may instead be random forest. A respective anomaly detector is generated for each distinct pair of anomaly detection algorithm and dataset. For example, anomaly detector D2A is based on anomaly detection algorithm A and uses dataset DS2. Anomaly detector D3B is instead based on anomaly detection algorithm B and uses dataset DS3.

In this example, there are 2 algorithms×3 datasets=six anomaly detectors. In an embodiment, all anomaly detectors of a same anomaly detection algorithm have identical hyperparameters values settings and differ only due to being trained with different respective training corpuses. In other words, those anomaly detectors may be identical before training, but are functionally and internally distinct after training.

In an embodiment, anomaly detection algorithms A-B are so different from each other that they have disjoint (i.e. non-overlapping) hyperparameters sets. For example, an ANN and a random forest may have no hyperparameter in common. In an embodiment, anomaly detection algorithms A-B have disjoint (i.e. non-overlapping) hyperparameters sets except that they both may have a contamination factor hyperparameter.

1.3 Discovery of Anomaly Thresholds

In operation, an intermediate goal is to select a respective best (i.e. most accurate) anomaly threshold for each anomaly detector. For example, anomaly threshold T2A is selected for anomaly detector D2A.

In an embodiment, each of anomaly thresholds T1A-T3A and T1B-T3B are selected from several predefined candidate thresholds 121-122. In an embodiment, most or all predefined candidate thresholds are (e.g. evenly spaced) in an inclusive range from 0.9 to 0.95. For example, the predefined candidate thresholds may be 0.9, 0.91, 0.92, 0.93, 0.94, and 0.95.

Each predefined candidate threshold is empirically evaluated to measure a respective fitness score for each anomaly detector with its respective dataset. For selecting respective anomaly thresholds T1A-T1B, same predefined candidate threshold 122 with same dataset DS1 may have different respective fitness scores 132-133 for respective anomaly detectors D1A and D1B. For selecting anomaly threshold T1A, same anomaly detector D1A with same dataset DS1 may have different respective fitness scores 131-132 for respective predefined candidate thresholds 121-122.

A supervised fitness score may be measured as discussed later herein. If fitness score 131 is the highest of all of fitness scores 131-132 for anomaly detector D1A with dataset DS1, then anomaly threshold T1A may be set to predefined candidate threshold 121 that caused highest fitness score 131.

1.4 Universal Anomaly Threshold

Universal anomaly threshold 140 is the average of all anomaly thresholds T1A-T3A and T1B-T3B. With anomaly score transformations discussed later herein, universal anomaly threshold 140 may be general enough to be used with almost any (e.g. new) anomaly detection algorithm and almost any (e.g. new and/or unlabeled) dataset. Future proofing is provided by universal anomaly threshold 140's ability to accommodate algorithms and datasets that were not used (or did not exist) for generation of universal anomaly threshold 140.

Universal anomaly threshold 140 is not a contamination factor and can be used with a dataset having a different respective contamination factor than the respective contamination factors of datasets DS1-DS3. Anomaly score transformations discussed later herein adjust for different contamination factors without adjusting universal anomaly threshold 140.

Unlike with state of the art threshold calibration, universal anomaly threshold 140 effectively is a probability threshold that will never exceed one (i.e. 100%) and never be less than 0.5 (i.e. 50%, even though a transformed anomaly score may be as low as zero), which means that universal anomaly threshold 140 is expected to exceed most transformed anomaly scores. In other words with universal anomaly threshold 140, non-anomalies are expected to be more numerous than anomalies.

2.0 Example Universal Anomaly Threshold Discovery Process

Figure 2:
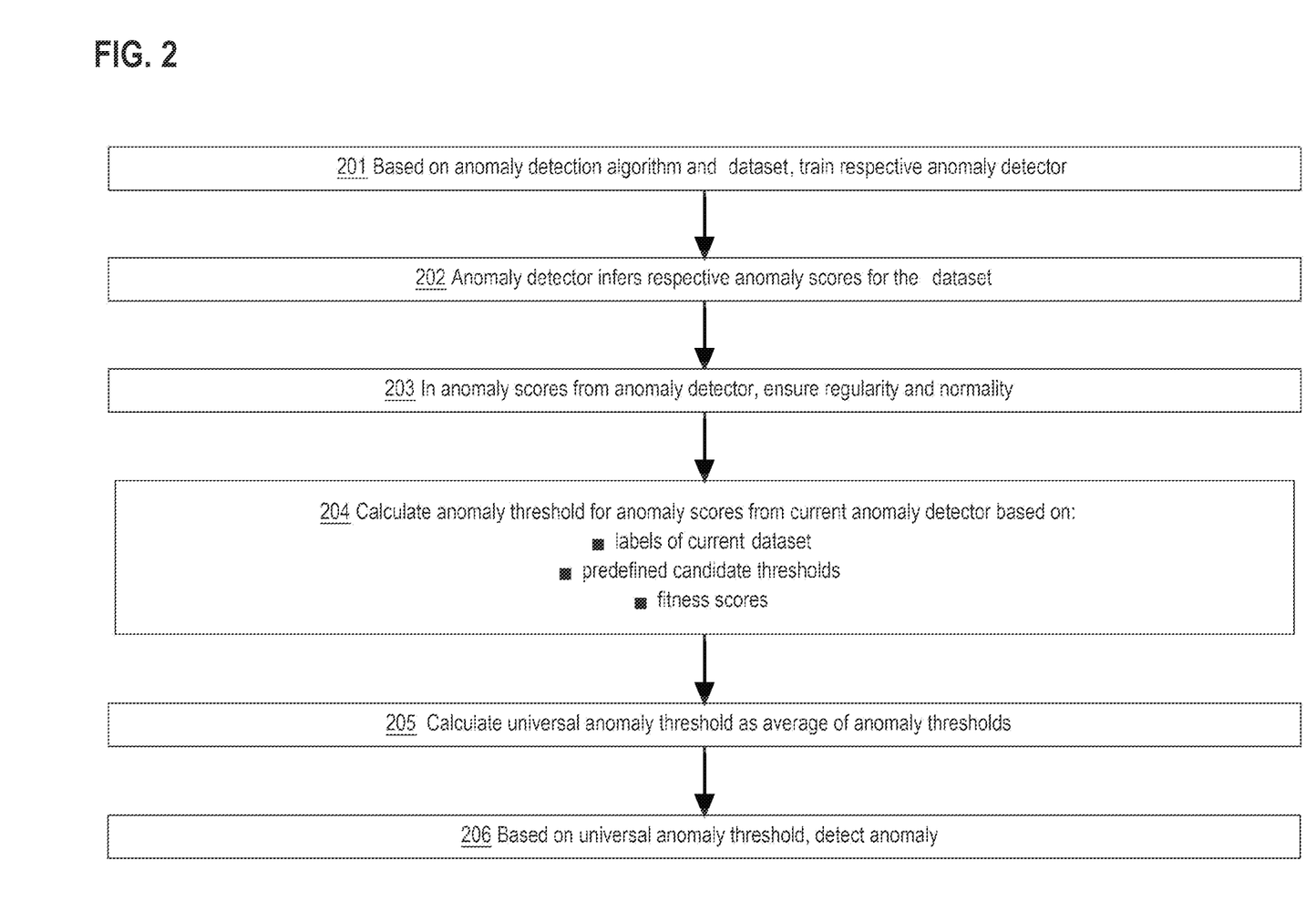
FIG. 2 is a flow diagram that depicts an example process that a computer may use to provide anomaly detector calibration for ML using a universal anomaly threshold based on several labeled datasets and transformation of anomaly scores from one or more anomaly detectors.

FIG. 2 is a flow diagram that depicts an example process that computer 100 may use to provide anomaly detector calibration for machine learning (ML) using universal anomaly threshold 140 based on several labeled datasets DS1-DS3 and transformation of anomaly scores from anomaly detectors D1A-D3A and D1B-D3B. FIG. 2 is discussed with reference to FIG. 1.

Steps 201-204 are (e.g. concurrently) repeated for each of anomaly detectors D1A-D3A and D1B-D3B as a current anomaly detector. Herein, a current dataset is the dataset of the current anomaly detector.

Based on the anomaly detection algorithm of the current anomaly detector and the current dataset, step 201 trains the current anomaly detector. For example if anomaly detection algorithms A-B respectively are supervised and unsupervised, step 201 may, using labeled dataset DS1, supervised train anomaly detector D1A and unsupervised train anomaly detector D1B.

In step 202, the current anomaly detector infers respective anomaly scores for the tuples of the current dataset as discussed earlier and later herein. For example, anomaly detector D3B infers anomaly scores 111-112 for respective tuples in dataset DS3.

In anomaly scores from the current anomaly detector, step 203 ensures regularity and normality. Herein, regularity means that, by design, an anomaly cannot receive a lowest possible anomaly score (e.g. zero). Herein, (e.g. unit) normality means that, by design, an inclusive value range of zero to one contains all anomaly scores.

Raw (i.e. original) anomaly scores as inferred by anomaly detectors are not required to have regularity and normality because those qualities may be provided by transformation of the raw anomaly scores into transformed anomaly scores as discussed later herein. Step 203 applies needed transformation(s). Which transformation(s), if any, are needed depends on which of anomaly detection algorithms A-B is the current anomaly detector based on.

Step 204 calculates a respective anomaly threshold for anomaly scores from the current anomaly detector with the current dataset. Step 204 may evaluate predefined candidate thresholds 121-122 as discussed earlier herein. For example as discussed earlier herein, supervised measurement of fitness scores by step 204 may compare binary classes (i.e. anomaly or non-anomaly per a current predefined candidate threshold) of previous step 203's transformed anomaly scores of tuples of the current dataset to binary classes of labels of those tuples.

Step 205 calculates universal anomaly threshold 140 as an (e.g. arithmetic or geometric) average of anomaly thresholds T1A-T3A and T1B-T3B. In some examples, hours or days elapse between steps 205-206 and/or steps 205-206 are performed on separate computers in separate environments. Step 206 may use any anomaly detector of FIG. 1 or an additional anomaly detector to detect that a (e.g. new and/or unlabeled) tuple is an anomaly. The additional anomaly detector may already be supervised or unsupervised trained and may or may not be based on either of anomaly detection algorithms A-B.

In an embodiment, the process of FIG. 2 uses none of a metamodel, meta-features, cross validation, and sorted anomaly scores. An embodiment of the process of FIG. 2 may be implemented entirely within a machine learning (ML) pipeline.

3.0 Example Unsupervised Testing Process

Figure 3:
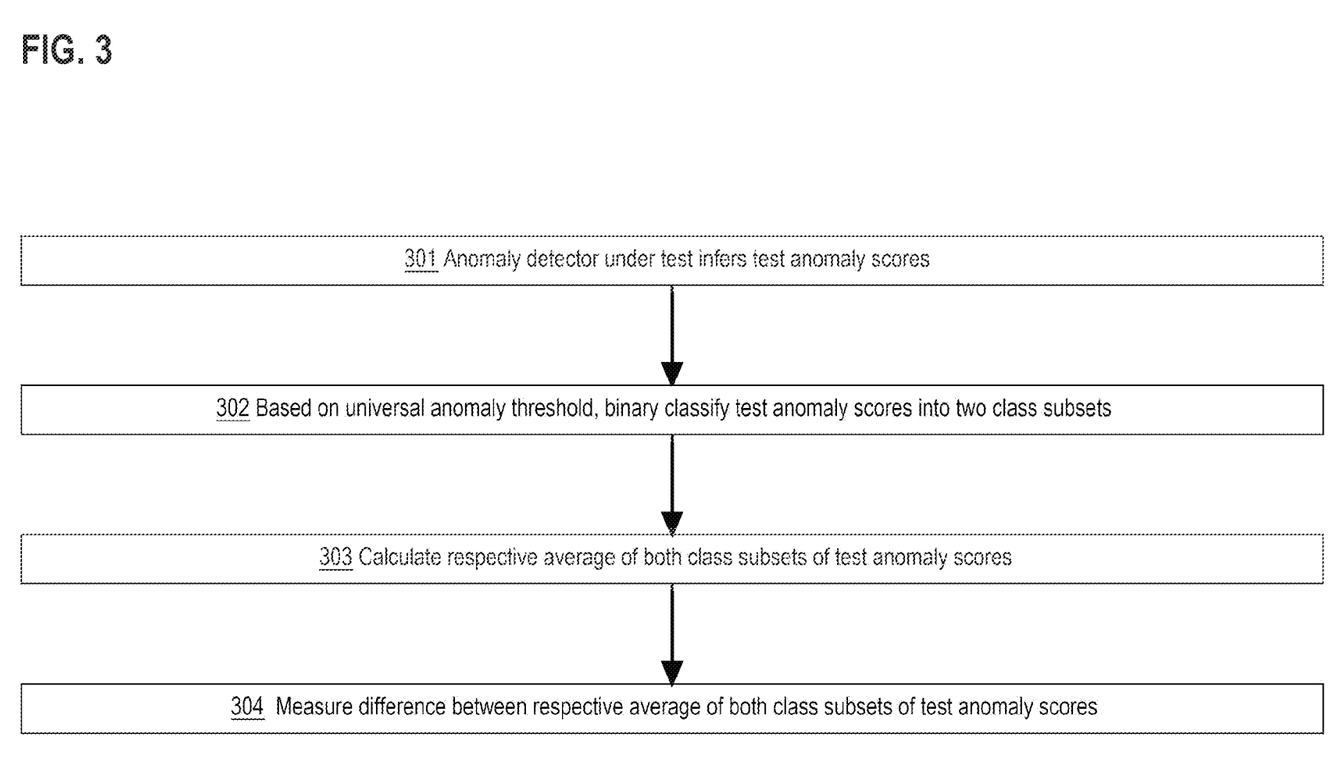
FIG. 3 is a flow diagram that depicts example process that a computer may use with a universal anomaly threshold to unsupervised measure a validation score of an anomaly detector under test.

FIG. 3 is a flow diagram that depicts an example process that computer 100 may use with universal anomaly threshold 140 to unsupervised measure a validation score of an anomaly detector under test that may or may not be one of the anomaly detectors of FIG. 1 and may or may not be based on one of anomaly detection algorithms A-B. FIG. 3 is discussed with reference to FIG. 1.

The anomaly detector under test was already supervised or unsupervised trained, depending on the embodiment. In step 301, the anomaly detector under test infers test anomaly scores for test tuples in a labeled or unlabeled test corpus that may or may not contain some or all of datasets DS1-DS3. Between steps 301-302, the test anomaly scores are transformed as discussed earlier herein from raw anomaly scores to transformed anomaly scores that have regularity and normality.

Various embodiments may or may not use any of the following transformations that regularize (i.e. impose regularity) raw anomaly scores.

The following baseline formula may provide regularity, where $S(o)$ is a raw anomaly score and $base_s$ is a baseline raw anomaly score for non-anomalies, which is a minimum possible raw anomaly score, which may or may not be zero.

$$\max(0, S(o) - base_s)$$

The following linear inversion formula may provide regularity, where $S_{max}$ is a maximum possible raw anomaly score, which may or may not be greater than one.

$$S_{max} - S(o)$$

The following logarithmic inversion formula may provide regularity.

$$\log(S(o)/S_{max})$$

Regularity is a prerequisite of normalization herein. The following linear formula may provide normality (i.e. normalization).

$$\frac{S(o) - S_{min}}{S_{max} - S_{min}}$$

In various embodiments, normalization entails fitting a Gaussian distribution or a gamma distribution to a population of anomaly scores. The fitted distribution may be used to normalize anomaly scores.

Based on universal anomaly threshold 140, step 302 binary classifies, into two class subsets (i.e. anomalies and non-anomalies), the transformed test anomaly scores. Step 303 calculates a respective average of both class subsets of test anomaly scores.

Step 304 measures a validation score of the anomaly detector under test as a (e.g. arithmetic subtractive) difference between the respective average of both class subsets of test anomaly scores. In an embodiment, the validation score is measured with the following formula.

$$\text{mean}(\text{AnomalyScores}_{anomalies}) - \text{mean}(\text{AnomalyScores}_{normals})$$

Effectively, the above formula measures separation between both classes. Increased separation indicates increased fitness of the anomaly detector under test. Comparing the validation score to a predefined validation threshold causes validation to succeed or fail. Because the transformed anomaly scores are universal, directly comparing validation scores facilitates ranking of multiple anomaly detectors and selecting the best anomaly detector(s).

4.0 Exemplary Embodiment

The following exemplary embodiment may incorporate aspects of embodiments presented earlier herein. Design choices in this exemplary embodiment are demonstrative and do not limit the earlier embodiments. The following pseudocode algorithm calculates a universal anomaly threshold and expects the following inputs.

A collection of historical, labeled anomaly detection datasets, D

One or more anomaly detection algorithms, A, for which a shared meta-learned unified (i.e. universal) anomaly score threshold is to be learned The following pseudocode algorithm emits the following output.

The estimated unified anomaly score threshold

The pseudocode algorithm has the following steps.
1. For each dataset, d, in D:
   a. For each anomaly detection algorithm, a, in A:
      i. Train a on d, to create anomaly detection model, m
      ii. Use m to predict anomaly scores, s, for d
      iii. Unify the anomaly scores s.
      iv. Scale the anomaly scores s by dividing all anomaly scores by the maximum anomaly score. (In some embodiments, this step may be optional (e.g. for anomaly detection algorithm A and/or B) and included to ensure that anomaly scores always span the full range of values between [0, 1].)
      v. Record the optimal unified anomaly score threshold, t[a, d], for s using the labels of d
2. Return the average over all values t[a, d] as the unified anomaly score threshold.

The above pseudocode often produces values near 0.95, which can be hard-coded into software applications. Above step iii regularizes. Above step iv normalizes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
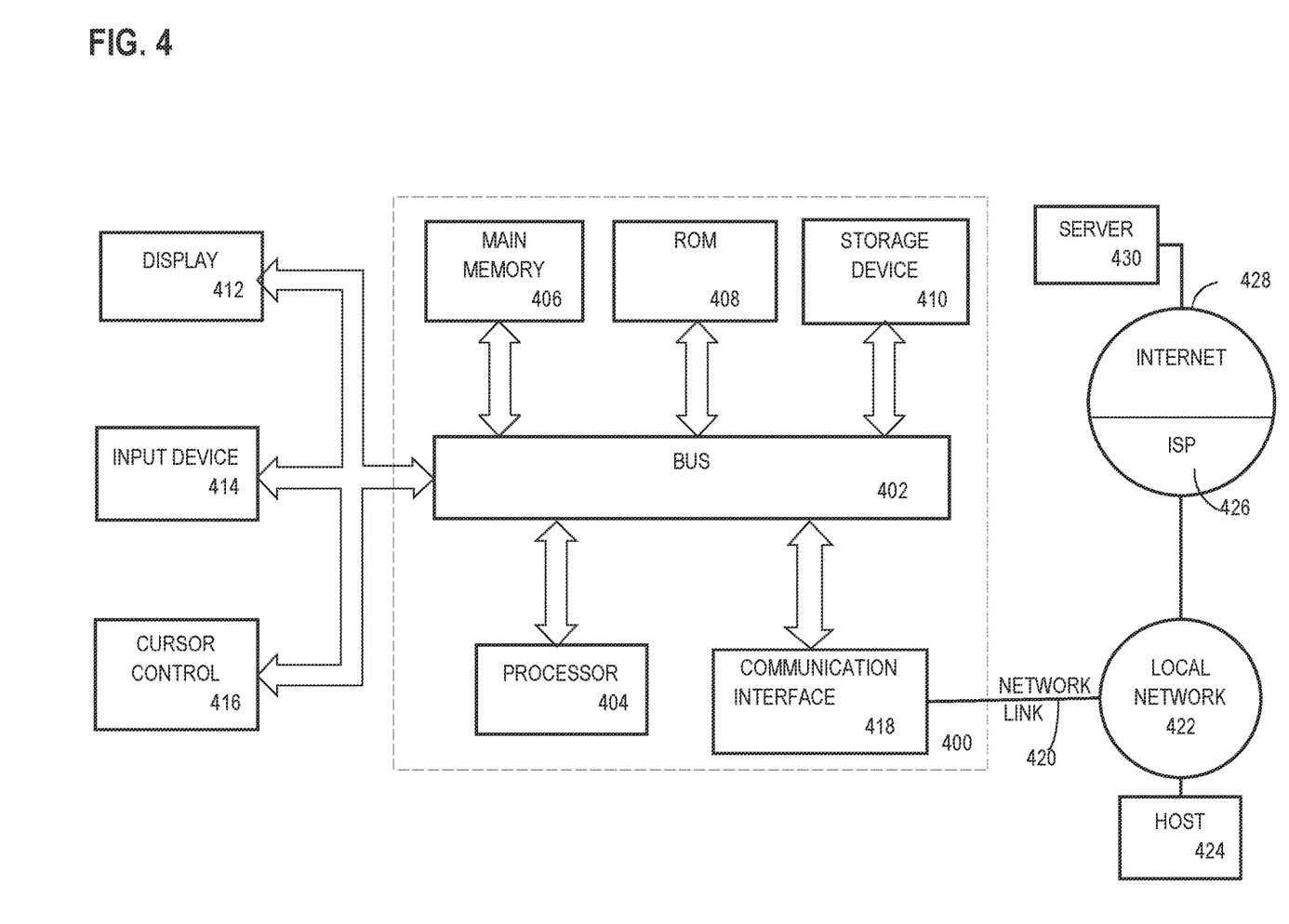
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
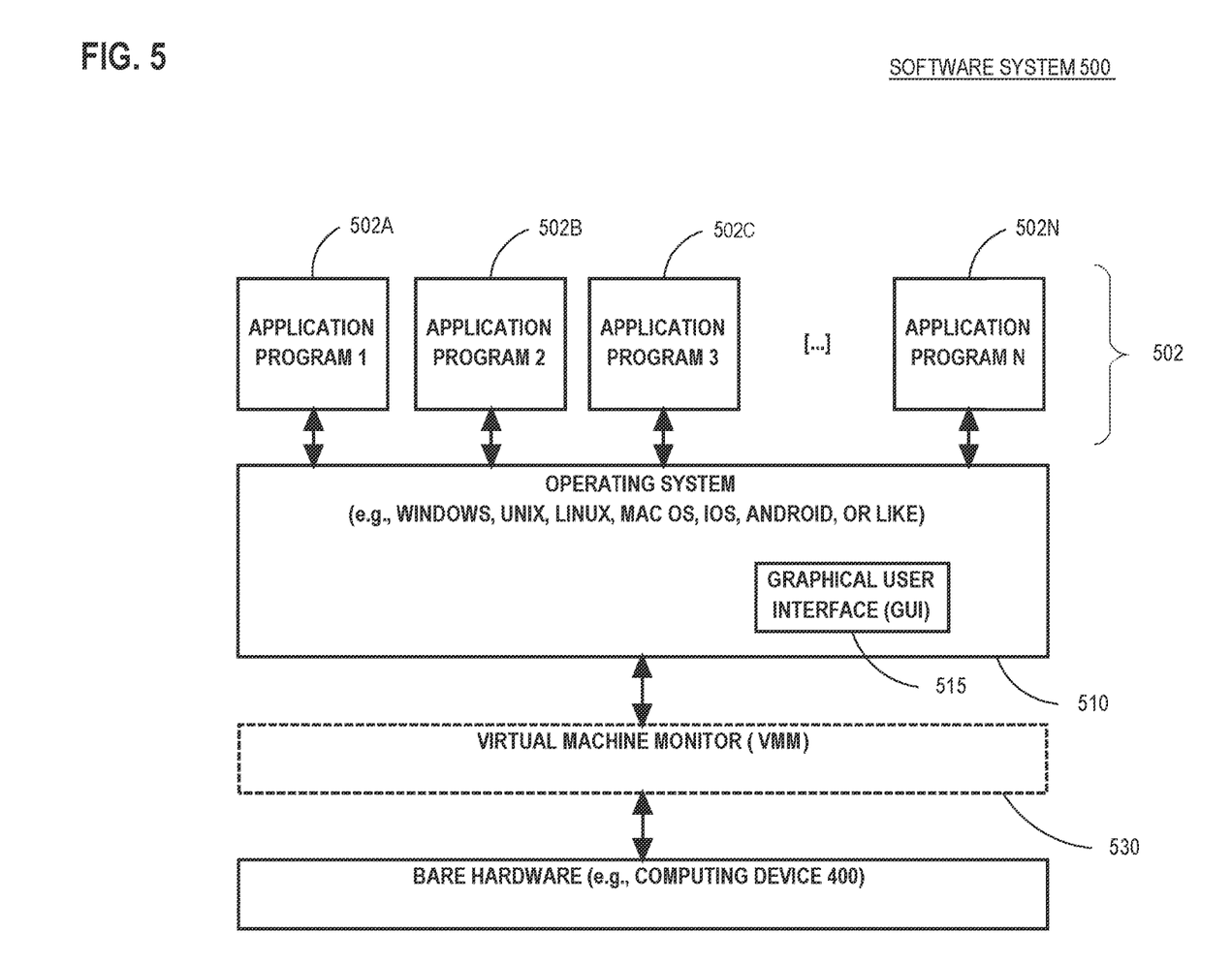
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 processing a plurality of pairs that consists of distinct pairs of an anomaly detection algorithm and a labeled dataset from a plurality of anomaly detection algorithms and a plurality of labeled datasets, including processing each distinct pair of the plurality of pairs by:
  a) generating and training, based on the anomaly detection algorithm of the distinct pair and the labeled dataset of the distinct pair, an anomaly detector of a plurality of anomaly detectors;
  b) inferring, by the anomaly detector, a plurality of anomaly scores for the labeled dataset;
  c) ensuring in said plurality of anomaly scores from the anomaly detector: i) regularity that an anomaly score of zero cannot indicate an anomaly and ii) normality that an inclusive range of zero to one contains said plurality of anomaly scores from the anomaly detector;
  d) for said plurality of anomaly scores from the anomaly detector, calculating an anomaly threshold of a plurality of anomaly thresholds;
 calculating a universal anomaly threshold as an average of the plurality of anomaly thresholds; and
 detecting, based on the universal anomaly threshold, an anomaly.

2. The method of claim 1 wherein for each distinct pair of the plurality of pairs, said calculating the anomaly threshold for the plurality of anomaly scores from the anomaly detector is based on at least one selected from the group consisting of labels of the labeled dataset of the distinct pair, a predefined plurality of candidate thresholds, and a plurality of fitness scores.

3. The method of claim 1 wherein said detecting the anomaly based on the universal anomaly threshold is performed by a particular anomaly detector that is at least one selected from the group consisting of an unsupervised anomaly detector, an anomaly detector that is not in the plurality of anomaly detectors, and an anomaly detector that is not based on the plurality of anomaly detection algorithms.

4. The method of claim 3 further comprising:
 the particular anomaly detector inferring a particular plurality of anomaly scores;
 selecting, based on the universal anomaly threshold, a subset of the particular plurality of anomaly scores;
 calculating an average of the subset of the particular plurality of anomaly scores.

5. The method of claim 4 further comprising measuring a difference between the average of the subset of the particular plurality of anomaly scores and an average of the particular plurality of anomaly scores that are not in the subset of the particular plurality of anomaly scores.

6. The method of claim 1 wherein said detecting the anomaly based on the universal anomaly threshold comprises detecting that an unlabeled tuple is anomalous.

7. The method of claim 1 wherein the universal anomaly threshold is a probability threshold.

8. The method of claim 1 wherein the universal anomaly threshold cannot be less than 0.5.

9. The method of claim 1 constrained by at least one selected from the group consisting of:
 a) the method does not use at least one selected from the group consisting of a metamodel, meta-features, cross validation, and sorted anomaly scores and
 b) the method occurs entirely within a machine learning (ML) pipeline.

10. The method of claim 1 wherein;
 each anomaly detection algorithm of the plurality of anomaly detection algorithms has a disjoint set of hyperparameters.

11. One or more non-transitory computer-readable media storing instructions that, when executed by one or more processors, cause:
 processing a plurality of pairs that consists of distinct pairs of an anomaly detection algorithm and a labeled dataset from a plurality of anomaly detection algorithms and a plurality of labeled datasets, including processing each distinct pair of the plurality of pairs by:
  a) generating and training, based on the anomaly detection algorithm of the distinct pair and the labeled dataset of the distinct pair, an anomaly detector of a plurality of anomaly detectors;
  b) inferring, by the anomaly detector, a plurality of anomaly scores for the labeled dataset;
  c) ensuring in said plurality of anomaly scores from the anomaly detector: i) regularity that an anomaly score of zero cannot indicate an anomaly and ii) normality that an inclusive range of zero to one contains said plurality of anomaly scores from the anomaly detector;
  d) for said plurality of anomaly scores from the anomaly detector, calculating an anomaly threshold of a plurality of anomaly thresholds;
 calculating a universal anomaly threshold as an average of the plurality of anomaly thresholds; and
 detecting, based on the universal anomaly threshold, an anomaly.

12. The one or more non-transitory computer-readable media of claim 11 wherein for each distinct pair of the plurality of pairs, said calculating the anomaly threshold for the plurality of anomaly scores from the anomaly detector is based on at least one selected from the group consisting of labels of the labeled dataset of the distinct pair, a predefined plurality of candidate thresholds, and a plurality of fitness scores.

13. The one or more non-transitory computer-readable media of claim 11 wherein said detecting the anomaly based on the universal anomaly threshold is performed by a particular anomaly detector that is at least one selected from the group consisting of an unsupervised anomaly detector, an anomaly detector that is not in the plurality of anomaly detectors, and an anomaly detector that is not based on the plurality of anomaly detection algorithms.

14. The one or more non-transitory computer-readable media of claim 13 wherein the instructions further cause:
the particular anomaly detector inferring a particular plurality of anomaly scores;
selecting, based on the universal anomaly threshold, a subset of the particular plurality of anomaly scores;
calculating an average of the subset of the particular plurality of anomaly scores.

15. The one or more non-transitory computer-readable media of claim 14 wherein the instructions further cause measuring a difference between the average of the subset of the particular plurality of anomaly scores and an average of the particular plurality of anomaly scores that are not in the subset of the particular plurality of anomaly scores.

16. The one or more non-transitory computer-readable media of claim 11 wherein said detecting the anomaly based on the universal anomaly threshold comprises detecting that an unlabeled tuple is anomalous.

17. The one or more non-transitory computer-readable media of claim 11 wherein the universal anomaly threshold is a probability threshold.

18. The one or more non-transitory computer-readable media of claim 11 wherein the universal anomaly threshold cannot be less than 0.5.

19. The one or more non-transitory computer-readable media of claim 11 constrained by at least one selected from the group consisting of:
a) the instructions do not use at least one selected from the group consisting of a metamodel, meta-features, cross validation, and sorted anomaly scores and
b) the instructions execute entirely within a machine learning (ML) pipeline.

20. The one or more non-transitory computer-readable media of claim 11 wherein;
each anomaly detection algorithm of the plurality of anomaly detection algorithms has a disjoint set of hyperparameters.

* * * * *